United States Patent [19]

Adair

[11] 4,142,294
[45] Mar. 6, 1979

[54] CORD CLAMP FOR DRAFTING BOARD ASSEMBLY

[75] Inventor: William A. Adair, Des Plaines, Ill.

[73] Assignee: Teledyne Industries Inc., Los Angeles, Calif.

[21] Appl. No.: 898,941

[22] Filed: Apr. 21, 1978

[51] Int. Cl.² .......................................... B43L 13/02
[52] U.S. Cl. ................................ 33/80; 24/255 SL; 24/129 R
[58] Field of Search .......... 24/255 SL, 129 D, 129 R; 33/80

[56] References Cited

U.S. PATENT DOCUMENTS

| 3,818,871 | 1/1958 | Beaudry | 24/255 SL |
| 3,824,654 | 7/1974 | Takabayashi | 24/255 SL |
| 3,874,042 | 4/1975 | Eddleman | 24/255 SL |
| 3,978,555 | 9/1976 | Weisenthal | 24/255 SL |

FOREIGN PATENT DOCUMENTS 2524269  9/1976  Fed. Rep. of Germany ........ 24/255 R
793067   4/1958  United Kingdom .................... 33/80

Primary Examiner—Harry N. Haroian
Attorney, Agent, or Firm—Lockwood, Dewey, Alex & Cummings

[57] ABSTRACT

A cord clamp of integrally molded plastic construction particularly useful for adjustably securing a straight-edge mounting cord to a drafting board. The clamp includes two mating, but not identical halves integrally hinged together like the halves of a clam shell. One of the halves of the clamp is adapted to be mounted on a drafting board or other support and may be considered as the mounting half. The other half is the one that swings open and closed and may be considered as the closing half. The mating surfaces of the two halves are interrupted by offset recesses which cooperate to define a labyrinth passageway capable of retaining a cord therein and clamping it between the two halves. A user may readily remove the cord from the clamp or adjust its position therein by manually opening the clamp without using tools and thus exposing the cord.

12 Claims, 7 Drawing Figures

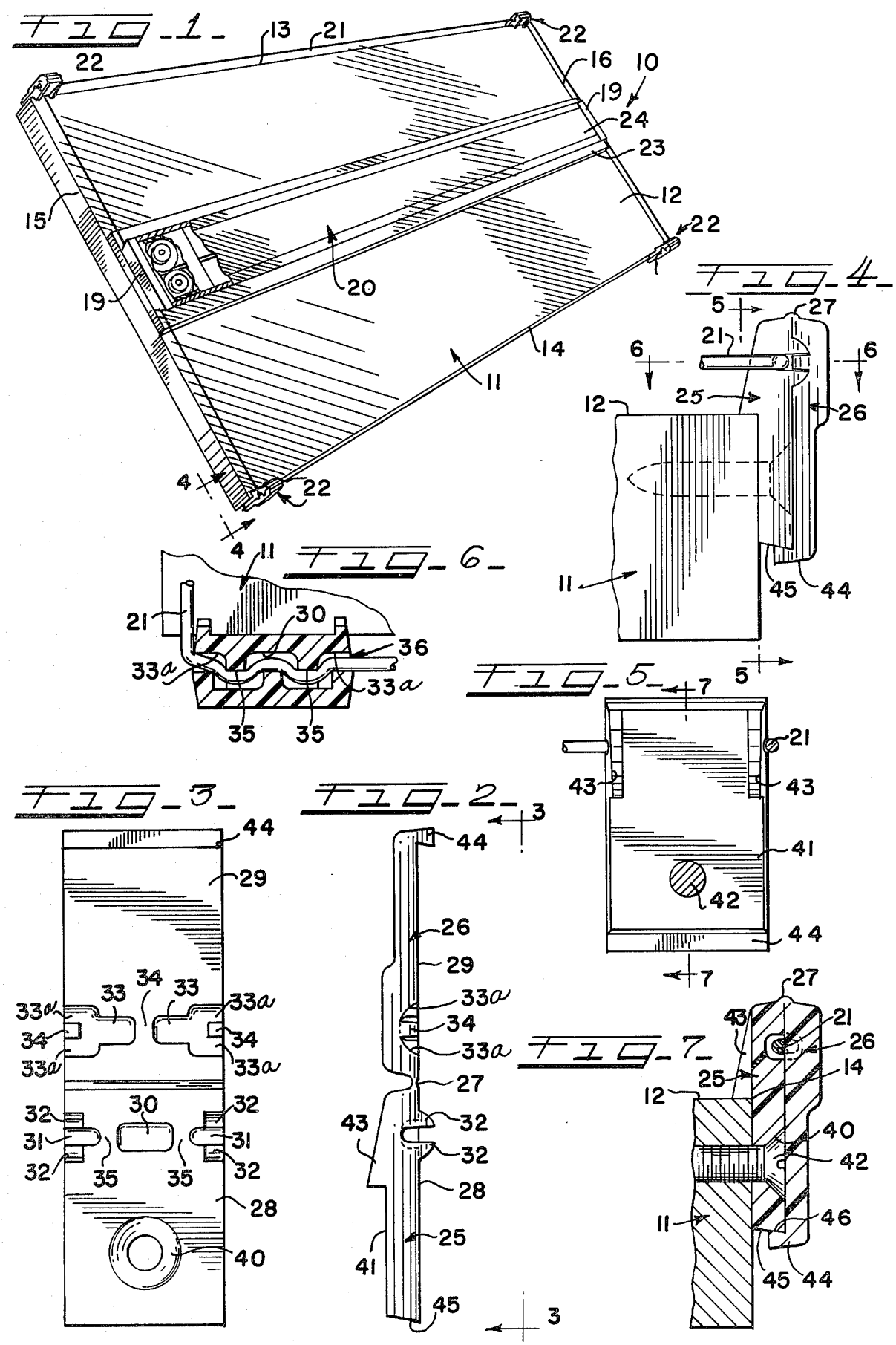

CORD CLAMP FOR DRAFTING BOARD ASSEMBLY

This invention relates generally to new and improved cord clamps and to the use thereof to adjustably secure a cord mounted straight-edge assembly in proper movable position on a drafting board.

Heretofore, drafting boards equipped with a cord mounted straight-edge assembly have utilized a combination of differing cord clamp, guide and retaining members in order to properly mount and adjustably position a straight-edge retaining cord around the drafting board. Such a drafting board/straight-edge combination is shown and described in U.S. Pat. No. 3,892,041, issued July 1, 1975 to the assignee of the present application, the disclosure of which applicant hereby incorporates herein by reference.

The new and improved cord clamps of the present invention are of integrally molded plastic construction having two mating, but not identical halves integrally hinged together like the two halves of a clam shell. The mating surfaces of the two halves are interrupted by offset recesses which cooperate to define or form a labyrinth passageway capable of retaining a cord therein and clamping it between the two halves without crushing or creasing it. The clamps are provided with integrally formed latches and when opened a cord may be readily removed, inserted or shifted as desired.

By virtue of the inexpensive, reliable, effective and convenient to install and use cord clamps of the present invention it is economically and functionally advantageous to eliminate the various prior arrangements of diverse cord mounting elements heretofore used in mounting straight-edge assemblies on drafting boards and replace the same with the new and improved cord clamps of this invention.

The object of the invention, generally stated, is the provision of a new and improved cord clamp which is particularly useful for adjustably securing a straight-edge mounting cord to a drafting board.

Other objects, features, and advantages of the invention will be apparent from the following detailed disclosure taken in conjunction with the accompanying drawings, wherein like reference numerals refer to like parts, and in which:

FIG. 1 is a top perspective view of a drafting board having mounted thereon a straight-edge assembly and a plurality of the cord mounting clamps, forming embodiments of the present invention, adjustably securing a straight-edge mounting cord.

FIG. 2 is a side elevational view of one of the cord mounting clamps of FIG. 1 shown in its as-molded open condition.

FIG. 3 is a view showing the interior mating surfaces of the cord mounting clamp taken on Line 3—3 of FIG. 2.

FIG. 4 is an elevational view taken along Line 4—4 of FIG. 1 showing a cord mounting clamp of FIGS. 1-3 in mounted position on the drafting board.

FIG. 5 is an elevational view taken on Line 5—5 of FIG. 4.

FIG. 6 is a horizontal sectional view taken on Line 6—6 of FIG. 4.

FIG. 7 is a vertical sectional view taken on Line 7—7 of FIG. 5.

Referring to FIG. 1, a complete drafting board/straight-edge assembly, indicated generally at 10, includes a drafting board, indicated generally at 11, having a drawing surface 12, top and bottom edges 13, 14 and side edges 15, 16.

A straight-edge assembly of known type, indicated generally at 20, is movably mounted on the upper surface 12 by a cord or string 21 which is retained in proper position by means of four cord mounting members or clamps 22 forming preferred embodiments of the invention. In the present embodiment, each clamp 22 is mounted on the board 11 adjacent one of the four top corners thereof. However, it will be understood that the clamps may also be mounted on the board 11 in spatial relation to the end surfaces 15 and/or 16 so as to define reference areas on either or both sides of the top surface drafting area. The straight-edge assembly 20 includes a base 23, a grasping member 24, and a pair of pulley block units 25—25 mounted in the opposite ends thereof. The cord 21 is strung on the board through the straight-edge assembly in known manner. The pulley block assembly 25 may be constructed in accordance with U.S. Pat. No. 3,892,042 denoted above.

The cord 21 is strung through each of the top cord mounting clamps 22 and extends through the interior of the straight-edge 20 from opposing side openings therein. The opposing ends of the cord 21 which exit from the straight-edge assembly 20 are each retained in one of the opposed bottom cord mounting clamps 22—22.

Referring to FIGS. 2 and 3, cord mounting clamps 22 are preferably molded from a suitable plastic material such, for example, as polypropylene. Each clamp 22 includes a mounting half indicated generally at 25 which is adapted to be secured to the drafting board and a closing half or cover indicated generally at 26. The cover or closing half 26 is integrally connected to the mounting half 25 by a thin flexible bridging or hinge portion 27.

The clamp halves 25 and 26 have substantially flat or planer mating surfaces 28 and 29 respectively which have mating engagement when a clamp 22 is in the closed condition. The surface 28 is interrupted by a centered inner recess or indentation 30 and a pair of outer recesses or indentations 31—31 which open to the outside of the clamp 22. The recesses or indentations 30 and 31 are horizontally aligned. Preferably, a pair of integrally formed projections or teeth 32—32 protrude from the surface 28 on opposite sides of each recess 31. A cord 21 can be wedged and retained between each pair of projections 32—32 when a clamp 32 is in its open condition. The teeth 32 further prevent slippage or rotational movement between the mating surfaces of the respective clamp halves 25 and 26.

The mating surface 29 of the clamp half 26 is interrupted by a pair of recesses or indentations 33—33. The inner ends of the recesses are separated by a partition 34. The outer ends of the recesses 33 are bifurcated as indicated at 33a—33a leaving dividing post formations 34 between the ends.

It will be seen that the recesses 30 and 31 in clamp half 25 and the recesses 33 in clamp 26 are offset so that when the clamp 22 is closed the partitions 35 in clamp half 25 are opposite the inner ends of recesses 33 in clamp half 26, the projections 32 protrude into the bifurcated ends 33a—33a, and the posts 34 in clamp half 26 are opposite the outer ends of recesses 31 and straddled by the projections 32. This offset arrangement provides a labyrinth-like passageway, generally indicated at 36 in FIG. 6, extending through each clamp 22 in its closed condition.

In order to secure the mounting half 25 in its preferred position along the respective edges 13 and 14 of the drafting board top surface 12, a counter-sunk aperture 40 extends from the planar surface 28 through the mounting half 25 to an opposing planar surface 41 thereon. A screw 42 (FIG. 5) or other suitable fastening means may be positioned through counter-sunk aperture 40 to secure the mounting half 25 to the side of the board 11. Addditionally, a pair of locating flanges 43—43 extend outwardly of the planar surface 41 adjacent the top of mounting half 25. The locating flanges 43 are adapted to rest against the top surface 12 of the board 11 in order to properly align the mounting halves with each other in relation to the drawing board surface 12.

In order to secure the respective clamp halves 25, 26 in closed condition, the distal end of closing half 26 includes an integrally formed latch or rib 44 which protrudes outwardly of the plane of mating surface 29 so as to retainingly engage the bottom surface 45 of the mounting half 25. Latch 44 includes a mounting half engaging surface 46 which is positioned to provide a slight included angle or re-entrant angle with mounting half surface 45 to assure retaining engagement therebetween. While the latch 44 is integrally formed with the swinging half 26, the plastic material from which it is made provides sufficient resilience thereto such that opening and closing the clamp 22 may be easily performed by a user without using hand tools.

In use, when the respective mounting halves are properly secured to the board 11, the teeth 32—32 through which the cord 21 is strung, all face outwardly of the drafting board 11 (see FIG. 4). The cord 21 is preferably wedged in between the teeth 32—32 by cord tension during adjustment, even when one or more of the closing halves 26 is not fastened over its respective mounting half 25.

While one particular embodiment of the invention has been shown and described, it will be obvious to those skilled in the art that changes and modifications may be made without departing from the invention in its broader aspects. For example, the relative positions of the various recesses defining the labyrinth passageway may be changed within the scope of the invention. Therefore, the aim in the appended claims is to cover all such changes and modifications as fall within the true spirit and scope of the invention.

I claim:

1. A cord clamp adapted for being mounted on an external surface, said clamp being of integrally molded plastic construction comprising two mating but not identical halves integrally hinged together by an integrally formed clam shell type hinge, one of said halves defining a mounting half and the other of said halves defining a swinging half, said mating halves having mating surfaces which have mating engagement when said clamp is in the closed condition, at least one of said mating surfaces being interrupted by offset recesses therein which in the closed condition of said clamp cooperate to form a labyrinth-like cord-receiving passageway through the closed clamp, and said mating surface on said mating surface on said mounting half including a pair of spaced apart protrusions straddling a portion of said labyrinth passageway on said surface and defining a keeper for retaining a cord on said mounting half when said clamp is in an open condition.

2. The cord clamp as defined in claim 1 wherein said offset recesses include a central recess positioned in one of said mating surfaces, a pair of spatially related opposing recesses positioned in the other of said mating surfaces, and each of said pair of recesses opening to the outside of the clamp.

3. The cord clamp as defined in claim 1 wherein said offset recesses include a central recess positioned in one of said mating surfaces, a first pair of spatially related recesses positioned in the other of said mating surfaces, and a second pair of spatially related recesses positioned in said one mating surface in spatial alignment with said central recess, and each of said second pair of recesses opening to the outside of the clamp.

4. The cord clamp as defined in claim 3 wherein a cord retaining protrusion extends outwardly of said one mating surface subjacent each of said second pair of recesses, and each protrusion being matingly engageable with one of said first pair of recesses when said clamp is in closed condition.

5. The cord clamp as defined in claim 1 wherein one of said halves thereof includes an integrally formed latch for releasably securing said halves together in a closed condition.

6. In a drafting board assembly including a drafting board having a drawing surface thereon, a straight-edge assembly, and cord mounting means attached to said board for retaining said straight-edge assembly thereon, the improvement wherein said cord mounting means comprises a cord clamp of integrally molded construction including two mating but not identical halves joined together by a clam shell-type hinge, one of said halves defining a mounting half adapted for engagement with said drafting board and the other of said halves defining a swinging half, said halves including surfaces adapted for mating engagement when said clamp is in the closed condition, at least one of said mating surfaces including recesses thereon defining a labyrinth passageway extending through said clamp in which a cord may be clamped without being crushed, and said mating surface on said mounting half including a pair of spaced apart protrusions straddling a portion of said labyrinth passageway on said surface and defining a keeper capable of retaining a cord on said mounting half when said clamp is in an open condition during base line adjustment of said straight-edge assembly.

7. The drafting board assembly as defined in claim 6 wherein said closing half includes an integrally formed latch at a distal end thereof for releasably retaining said halves together in a closed condition.

8. The drafting board assembly as defined in claim 6 wherein said offset recesses include a central recess positioned in one of said mating surfaces, a pair of spatially related opposing recesses positioned in the other of said mating surfaces, and each of said pair of recesses opening to the outside of the clamp.

9. The drafting board assembly as defined in claim 6 wherein said offset recesses include a central recess positioned in one of said mating surfaces, a first pair of spatially related recesses positioned in the other of said mating surfaces, and a second pair of spatially related recesses positioned in said one mating surface in spatial alignment with said central recess, and each of said second pair of recesses opening to the outside of the clamp.

10. The drafting board assembly as defined in claim 6 wherein a cord retaining protrusion extends outwardly of said one mating surface subjacent each of said second pair of recesses, and each protrusion being matingly engageable with one of said first pair of recesses when said clamp is in closed condition.

11. The cord clamp as defined in claim 1 wherein said mounting half includes a first mounting surface opposite said mating surface thereon, and a stop member protruding from said first mounting surface and including a second mounting surface thereon positioned perpendicularly to said first mounting surface, whereby said cord clamp may be secured on the edge of an external surface.

12. The drafting board assembly as defined in claim 6 wherein said cord clamp mounting half includes a first mounting surface opposite said mating surface thereon for engaging a side surface of said drafting board, and a stop member protruding from said first mounting surface and including a second mounting surface thereon positioned perpendicularly to said first surface for engaging said drawing surface of said drafting board, whereby said cord clamp is secured along an edge of said drafting board drawing surface so that any cord clamped therein is maintained at a fixed pre-determined distance from said drawing surface.

* * * * *